United States Patent [19]

Grosser

[11] Patent Number: 4,462,659
[45] Date of Patent: Jul. 31, 1984

[54] PRISM SYSTEM FOR A VARIABLE BINOCULAR TUBE

[76] Inventor: Johannes Grosser, 12, Ziegelmühlenweg, 69 Jena, District of Gera, German Democratic Rep.

[21] Appl. No.: 314,669

[22] Filed: Oct. 23, 1981

[30] Foreign Application Priority Data

Dec. 23, 1980 [DD] German Democratic Rep. ... 226553

[51] Int. Cl.³ .............................................. G02B 27/10
[52] U.S. Cl. ................................................... 350/173
[58] Field of Search ............... 350/173, 174, 172, 286, 350/287, 550, 569, 514, 145, 146

[56] References Cited

U.S. PATENT DOCUMENTS 2,317,988  5/1943  Forssberg ........................... 350/286
3,309,161  3/1967  Boughton ........................... 350/514
4,161,349  7/1979  Norman .............................. 350/173

FOREIGN PATENT DOCUMENTS 206861  2/1968  U.S.S.R. ............................. 350/173

Primary Examiner—Jon W. Henry

[57] ABSTRACT

The invention relates to a prism system for a binocular tube constituted of a beam splitting prism and two eyepiece prisms for directing two object beams which are split and transmitted at a beam splitting face of said beam splitting prism and fused, and are subject to one reflection in one eyepiece prism and to two reflections in the other eyepiece prism. Since the fused beams are composed of portions of both original beams it is feasible to binocularly view both imaged objects.

3 Claims, 4 Drawing Figures

PRISM SYSTEM FOR A VARIABLE BINOCULAR TUBE

BACKGROUND OF THE INVENTION

The invention relates to a prism system for a variable binocular tube comprising a beam splitting prism, an eyepiece prism having one effective plane of reflection and an eyepiece prism having two effective planes of reflection.

The beam splitting prism has reflecting and light transmitting faces and one beam splitting plane which splits incident object beams into a reflected and transmitted portion each and fuses the latter to two combined object beams.

The prism system can find application in diverse optical devices such as microscopes, telescopes etc. and can replace monocular observation units.

Previous prism systems for binocular tubes comprise a cube prism centrally arranged including a diametrically arranged beam splitting face which splits the incident beams into two initially diverging eyepiece beams, (refer also to Brockhaus "ABC der Optik" VEB. F. A. Brockhaus press, Leipzig, 1969, page 575).

Two subsequent eyepiece prisms render the two beams into parallel ones, the one partial beam being once reflected and the other partial beam being twice reflected subsequent to the beam splitting face.

The entire deflection by the system relative to the beam splitting face is towards the twice reflecting eyepiece prism. It is a particular feature of the previous prism systems that the one eyepiece prism only effects a lateral displacement of the beam, whereas the other only once reflecting eyepiece prism deflects the beam by 90°.

Furthermore, the optical path lengths of the light in glass and in air are substantial equal in both paths of beam and the light entrance faces and the light exit faces of all prisms are at right angles to the optical axis of the respective passing path of beam.

Two technical solution are known for adjustment of the eyepiece space at a constant optical path length between the tube attachment and the field of view aperture of the eyepieces. In the one solution the tube sockets for receiving the eyepieces are tiltable about a common axis about like angles.

It is, however, disadvantageous that the variation of the space between the two eyepieces obtained also involves a variation of the orientation of the reticle in the intermediate image plane of the eyepieces.

In the other more suitable technical solution the tube sockets for receiving the eyepieces are diametrically adjustable. The means for guiding the two base plates to set the eyes' space and guidings mounted on each base plate for simultaneously effecting a space variation between the eyepiece prism and the tube sockets are arranged at right angles to each other and in parallel to the path of beams of the eyepieces. Only the last, considered in direction of light propagation, of the operative reflection faces is displaced in both eyepiece path of beams so that tilting errors may occur on both sides.

The optical system of the binocular tubes is constituted of cubic and semi-cubic prisms and a semi-transparent beam splitting face.

The introduction of a second non-displaceable path of beams is only feasible with the diametrically displaceable binocular tube type.

The introduction place is, however, poorly accessible since it is located directly under the beam displacing eyepiece prism.

The two tubes and the coupling faces include an angle of 90° at a like optical path length. Since there are no common coupling faces, misadjustments easily result.

It is no advantage to exchange the two eyepieces in order to use the different number of reflections at an unchanged optical path length since this involves an unfavorable position for the operator.

A further disadvantage is involved through the comparatively wide angle of incidence of 45° relative to the beam splitting face.

SUMMARY OF THE INVENTION

It is an object of the present invention to obviate the above disadvantages.

It is a further object of the invention to provide an optical system for variable binocular tube permitting two neighbouring insights at any desired mutual inclination in a common plane.

It is still a further object of the invention to provide a prism system for a variable binocular tube which permits the introduction of a further adjacent or coinciding object beam.

These and other objects are realised in a prism system for variable binocular tubes comprising a beam splitting prism having two light entrance planes, two reflecting planes and two light exit planes, and a beam splitting face, an eyepiece prism having one effective reflecting face and one eyepiece prism having two effective reflecting faces.

The beam splitting prism is a double prism which has a symmetrical beam splitting face in its plane or symmetry and is suitable for at least two diverging incident beams.

The eyepiece prism having one effective reflection face is a prism similar in geometry to the beam splitting prism, however, without a beam splitting face. The eyepiece prism having two effective reflection faces is similar in geometry to half the beam splitting prism with the beam splitting face being replaced by a silvered one.

Both eyepiece prisms derived from the beam splitting prism are dimensional equal to the latter in geometry or greater or smaller by a same constant factor.

The light entrance faces and the light exit faces and the reflecting planes of the eyepiece prisms equal the corresponding ones of the beam splitting prism and are arranged adjacent the light exit planes of the latter. By selecting the beam splitting prism of the above type, the direction of observation, that is, the angle between the parallel combined object beams on the one hand and the beam splitting face on the other hand is $\sigma$, which is defined as $\sigma = (3/2)\delta + 2\zeta - 180°$ where $\delta$ is the angle of divergency between the fused object beams directly after fusing at beam splitting face, and $\zeta$ the angle of the edges of the side faces of the beam splitting prism.

The two fused object beams have equal path lengths in the prisms.

By a respective distribution of the spaces between the beam splitting prism on the one hand and the respective eyepiece prism on the other hand the images produced by the two fused object beams can always be focused into a common plane at right angles to the direction of observation provided that with $l_1 = \frac{\Delta P(\delta,\zeta)}{1 + \cos 2(\delta + \zeta)} + l_2 \frac{1 + \cos(\delta + 2\zeta)}{1 + \cos 2(\delta + \zeta)}$ where $l_1$ is the air space between the once reflecting eyepiece prism and the beam splitting prism $l_2$ is the air space between the twice reflecting eyepiece prism and the beam splitting prism. $\Delta P(\delta,\zeta)$ is the difference of the optical path lengths of the fused object beams, in the event that no air spaces exist between the beam splitting prism and the eyepiece prisms.

The relation of the air spaces between the once and twice reflecting eyepiece prism can also be realised by $$\frac{l_1}{l_2} = \left( \frac{\cos \frac{\delta + 2\zeta}{2}}{\cos (\delta + \zeta)} \right)^2.$$

Alternatively, the beam splitting face is embodied by discrete members, such as a semi-reflecting mirror and the diverse reflection faces by an arrangement of beam splitting and reflecting faces.

Thus it is feasible to have coincidence and intersection, respectively, of the eyepiece beams.

BRIEF DESCRIPTION OF THE DRAWINGS

In order that the invention may be more readily understood reference is made to the accompanying drawings which illustrate diagrammatically and by way of example three embodiments thereof and where.

DESCRIPTION OF PREFERRED EMBODIMENTS

Figure 1:
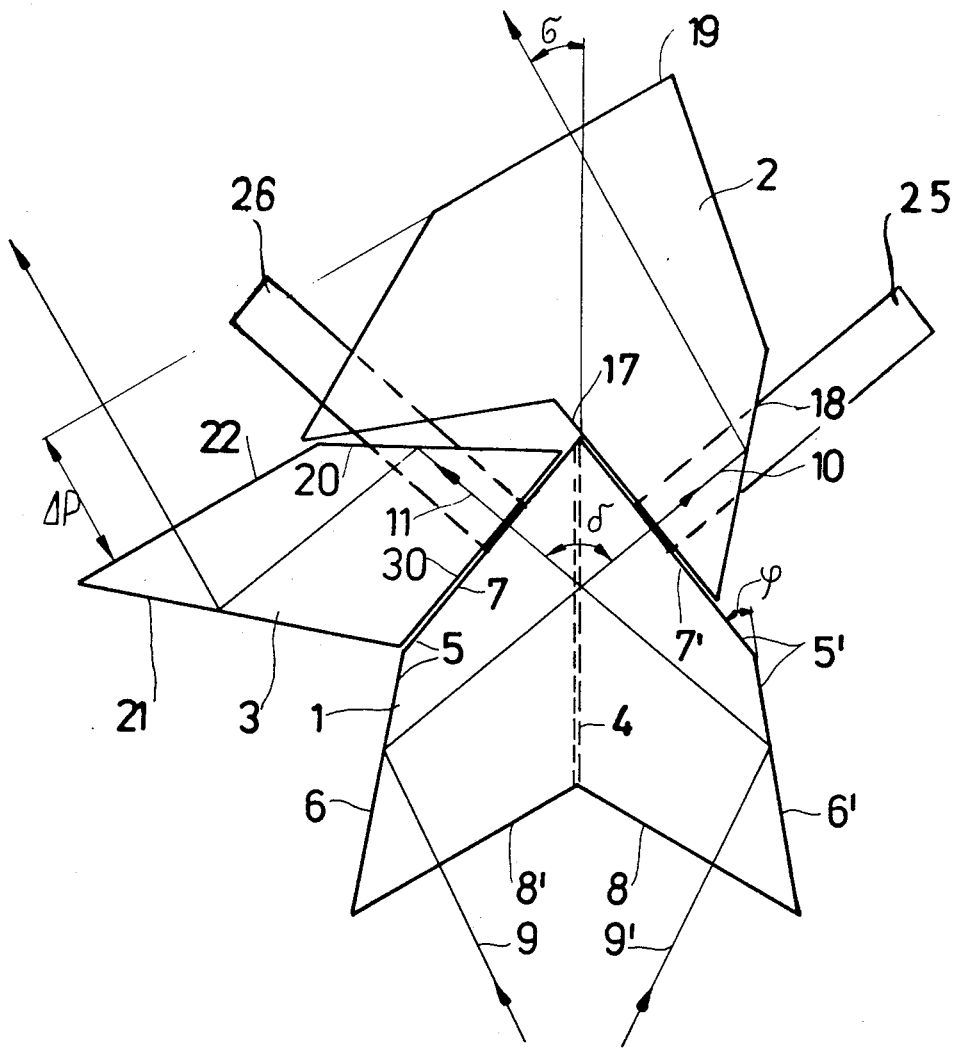
FIG. 1 is a schematic view of the principle of a prism system for a variable binocular tube, FIG. 2 a schematic view according to FIG. 1, with two edges of a prism cut off, FIG. 3 a schematic view according to FIG. 1 with supporting faces and mounts for the eyepieces, and FIG. 4 an embodiment of FIG. 1 with parallel light entrances.

FIG. 1 shows a prism system for a variable binocular tube. On both sides of a centrally arranged double prism 1 an eyepiece prism 2, on the one hand, and an eyepiece prism 3 on the other hand, are arranged.

The eyepiece prism 2 which one times reflects a beam 9 corresponds to the double prism 1 and the eyepiece prism 3 which twice reflects a beam 9' corresponds to the double prism 1 bisected along its plane of symmetry.

The plane of symmetry includes a base splitting face 4.

The double prism 1 has a first lateral face 5 and a second lateral face 5' the former is composed of a reflective plane 6 and a light exit plane 7, the latter of a reflective plane 6' and a light exit plane 7'.

Both planes 6 and 7 and the planes 6' and 7' include an angle $\zeta = 30°$.

The light entrance faces 8 and 8' of said prism 1 are symmetrically arranged relative to the beam splitting face 4. The eyepiece prism 2 is comprised of a light entrance plane 17, a reflecting face 18 and a light exit plane 19.

The eyepiece prism 3 which is constituted substantially of half the beam splitting prism 1 with respect to its geometry has a light entrance plane 30 in opposition to the light exit plane 7, two reflecting planes 20, and 21, and a light exit plane 22.

The prisms 2 and 3 are displaceable by means 25,26 relative to the prism 1 by equal amounts.

In operation, a first object beam 9 which, for example, images a not shown object, enters the prism system through the entrance plane 8 and is reflected at the reflecting plane 6 to the beam splitting face 4 where it is split into two portions, a reflected one and a transmitted one (10, 11).

A second object beam 9' which, for example, images a not shown graduation, enters the system via the entrance plane 8' and after reflection at the reflecting plane 6' is split into two portions, a reflected one and a transmitted one (10, 11) which coincide with the split beam 9 portions.

Thus a fused beam 10 results, composed of the transmitted portion of beam 9 and of the reflected portion of beam 9', whereas a fused base 11 is composed of the transmitted portion of beam 9' and of the reflected portion of beam 9.

The fused beams 10 and 11 include an angle of divergency $\delta = 100°$.

The fused beam 10 leaves the prism 1 via the exit plane 7', enters the prism 2 via the entrance plane 17 and after reflection at the reflecting plane 18 leaves prism 2 through the exit plane 19.

The fused beam 11 leaves the prism 1 through the exit plane 7 to enter the prism 3 via the entrance plane 30 for twice a reflection at the reflecting plane 20 and subsequently at the reflecting plane 21, from the latter the beam 11 leaves the prism 3 through an exit plane 22.

After leaving the eyepiece prisms 2, 3 the fused beams 10 and 11 are parallel to each other, they have been folded by the prisms 2, 3 and have been rendered inclined relative to the beam splitting face 4, the inclination is about $\sigma = 30°$ so that an operator (not shown) can view both, object and graduation under an angle of 30°.

$\Delta P$ designates the difference of the path lengths of the fused beams 10 and 11 from the splitting face 4 to the exit planes 19 and 22, respectively.

$\Delta P$ is variable by displacing the prisms 2, 3 along the fused beams 10 and 11, respectively, when entering said prism (up to reflection at 18 and 20, respectively).

It is also feasible only to employ one object beam 9 or 9' which is imaged as in a conventional binocular tube.

Figure 2:
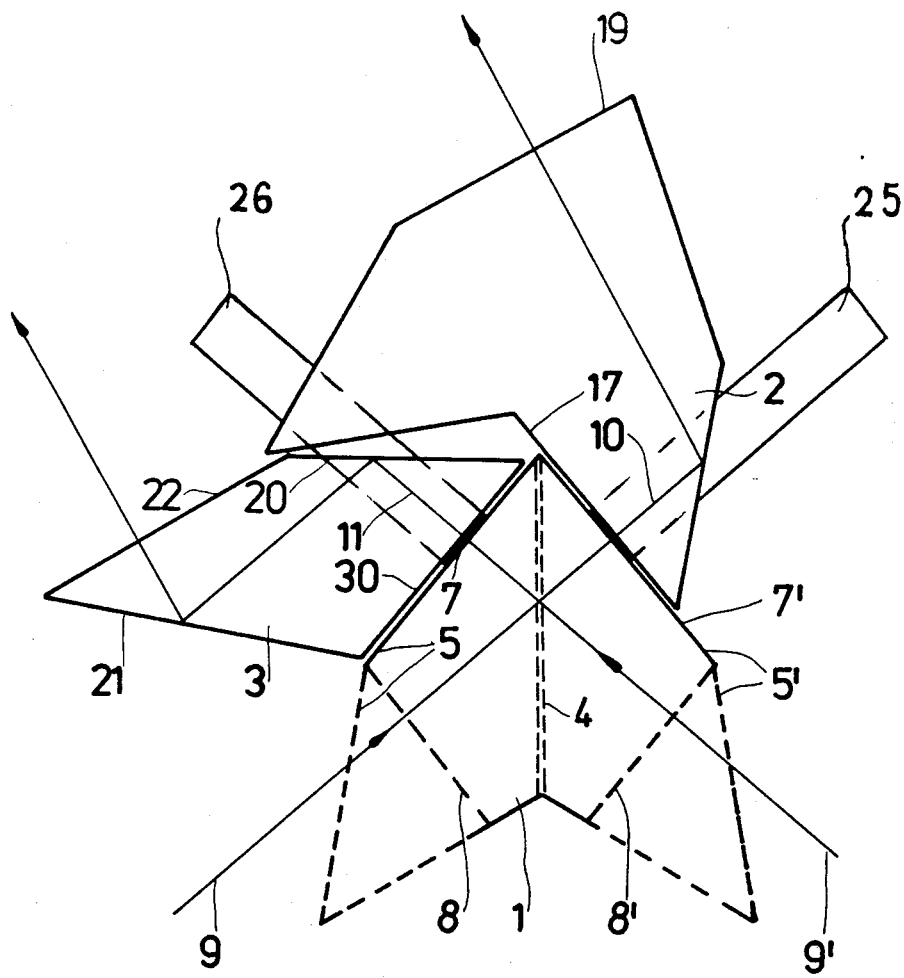

In FIG. 2 the two edges of the prism 1 of FIG. 1 are cut off, else the entire prism system is identical to FIG. 1 and like reference numerals designate like components.

The cut off edges are identified by dashed lines, so are entrance planes 8 and 8'.

The prism system of FIGS. 2 and 1 are also similar in operation with the exception of the beam 9, 9' not being reflected before splitting in prism 1.

The beams 9 and 9' can well enter the prism 1 thereby including diverging or converging angles.

It is also feasible to employ a beam splitting prism 1 in which the entering beams 9 and 9' are subject to any desired number of reflections before being split.

It is still further feasible that the fused beams 10 and 11, respectively, are subject to a plurality of reflections in the prisms 2, 3.

It is still further feasible to employ edge roof prisms for the prism 2, 3.

Figure 3:
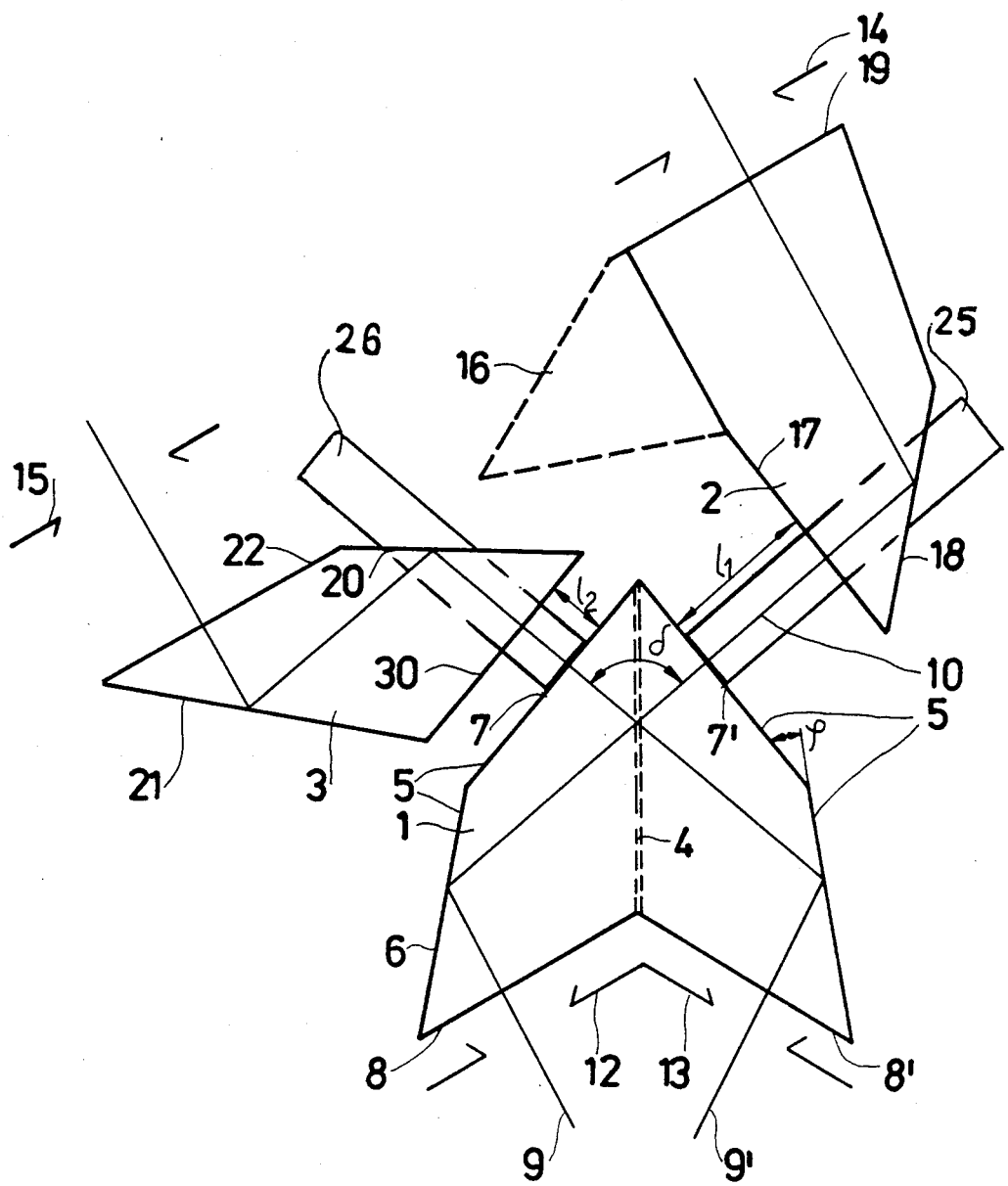

In FIG. 3 a prism system is shown in analogy to FIG. 1 additionally provided with support planes 12, 13 which permit installation in any other suitable device and passage of the light beam 9 and 9', respectively.

Furthermore two eyepiece sockets 14 and 15 are schematically represented which are connected by a not shown tube housing in which the prism system is arranged. The eyepiece sockets 14 and 15 are located in a common plane and adjacent and in parallel to the exit faces 19 and 22, respectively, of the prisms 2, 3.

An air space $l_1$ between the beam splitting prism 1 and the eyepiece prism 2, and an air space $l_2$ between the beam splitting prism 1 and the eyepiece prism 3 are so selected that the optical path of both fused beams 10 and 11 are equally long from the beam splitting face 4 up to the common plane of the two eyepiece sockets 14, 15. To permit operation of the entire prism system as disclosed in connection with FIGS. 1 to 3, guide tracks 25 and 26 are schematically represented in FIGS. 1 to 4.

The prism 2 is attached by a not shown means to the guide track 25 and is displaceable along said track which is in parallel to the fused beam 10 portion considered from splitting to impinging upon the reflective plane 18.

The prism 3 is attached to the guide track 26 by a not shown means and is displaceable along said track 26 which is in parallel to the fused beam portion 11 considered from splitting to the first reflection at the reflective plane 20.

An edge 16 of the eyepiece prism 2 is cut off. If necessary also other portions of the prisms 1, 2, 3 which do not contribute to beam directing can be cut off.

The incident beams 9 and 9' pass the prism system as described hereinbefore. A variation of the distance between the eyepiece sockets 14, 15 and, hence, of the eyes' distance is obtained by displacing the eyepiece prisms 2, 3 about equal amounts along the guide tracks 25,26, that is, of all reflective planes involved along the divergent beams 10, 11 after splitting and fusing.

Figure 4:
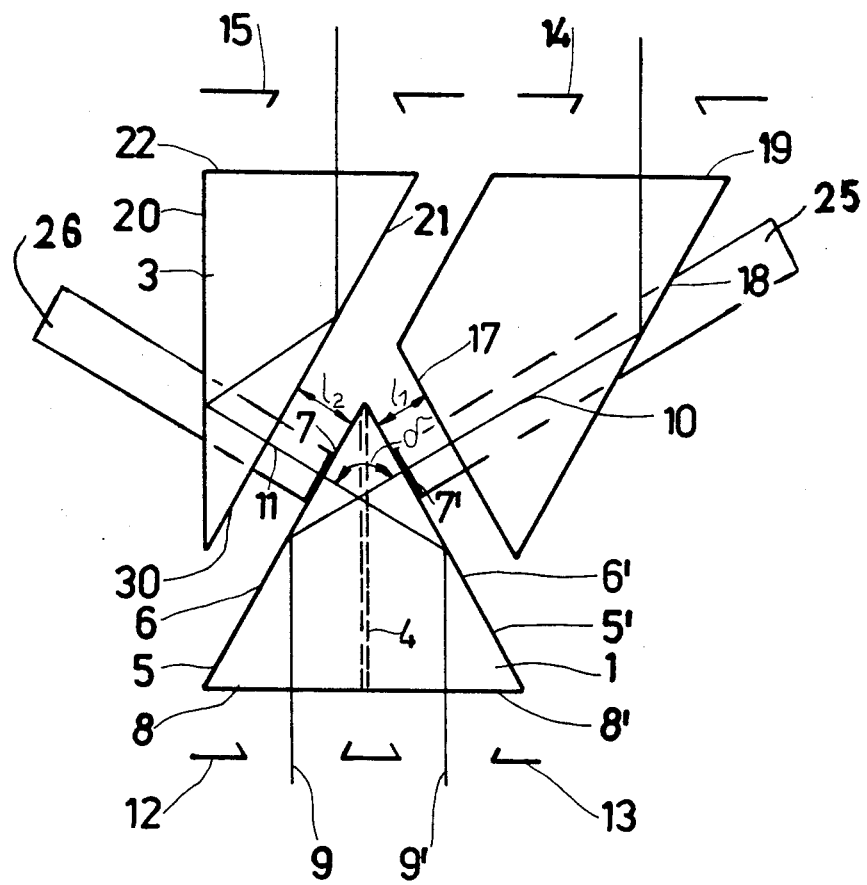

In FIG. 4 a prism system for a variable binocular tube is shown which is constituted of a 60°—60°—60° prism as a beam splitting prism 1.

The edge angle $\zeta=0$, so is the angle of observation $\delta$. Both fused beams 10 and 11 are oppositely deflected by equal amounts. The angle of divergence included by the two beams 9 and 9' directly after splitting and fusing is $\delta=120°$.

The angle of incidence of the beams 9 and 9' upon the beam splitting face 4 is, considered to the normal thereupon, 30°, that is, the angle of incidence is reduced compared to those in connection with FIGS. 1 to 3.

The supports 12 and 13 are arranged as a unit in parallel to the planes of incidence 8, 8' in a common plane at both sides of the (extended) beam splitting face 4.

Also the eyepiece sockets 14 and 15 are in parallel to the light exit planes 19 and 22, respectively, of the prisms 2, 3. The air spaces $l_1$ and $l_2$ are equally wide. Due to exploiting the total reflection the light reflecting plane 6 and the light exit plane 7, and the light reflecting plane 6' and the light exit plane 7' of the prism 1 are identical. The particular advantage of the embodiment according to FIG. 4 is based upon the fact that the two support faces 12 and 13 are in a common plane so that the introduction of beams is feasible substantially without any light losses and without the danger of misadjusting the system.

When introducing only one object beam 9 or 9' into the prism system either a correct image (via support 12) is obtained or a reversed image (via support 13). A variation of the distance between the eyepiece sockets 14, 15 is again obtained by displacing the eyepiece prisms 2, 3 along the guide tracks 25, 26. I claim:

1. Prism system for a variable binocular tube comprising in optical alignment
    a beam splitting prism having a first and a second light entrance plane for a first object beam and a second object beam, respectively, a beam splitting face for splitting said first object beam into a first reflected portion and into a first transmitted portion and said second object beam into a second reflected portion and into a second transmitted portion, and for fusing said first transmitted portion and said second reflected portion into a first fused object beam, and said second transmitted portion and said first reflected portion into a second fused object beam, and further having a first light exit plane and a second light exit plane for said first fused object beam and said second fused object beam, respectively,
    said first and said second light entrance plane, and said first and said second light exit plane being substantially symmetrically to said beam splitting face,
    a first eyepiece prism having a third light entrance plane, being substantially in parallel to said first light exit plane, at least a first reflection plane, a third light exit plane for said first fused object beam,
    means for displacing said first eyepiece prism substantially in parallel to said first fused object beam entering said first eyepiece prism by said third light entrance plane, and a second eyepiece prism having a fourth light entrance plane for said second fused object beam in parallel to said second light exit plane, at least a second and a third reflection plane, a fourth light exit plane for said second fused object beam,
    means for displacing said second eyepiece prism substantially in parallel to said second fused object beam entering said second eyepiece prism by said fourth entrance face,
    said third light exit plane and said fourth light exit plane being in parallel to each other,
    said light entrance planes, said reflection planes and said light exit planes being at right angles to a common plane,
    said first and second fused object beams after passing said third and fourth light exit planes, respectively, are in parallel to each other.

2. A prism system as claimed in claim 1, wherein at least a fourth reflection plane is provided in said beam splitting prism between said first light entrance plane and said beam splitting face, and at least a fifth reflection plane between said second light entrance plane and said beam splitting face.

3. A prism system as claimed in claim 2, wherein said first light exit plane and said fifth reflection plane are arranged in a common plane and said second light exit plane and said fourth reflection plane are arranged in another common plane.

* * * * *